(12) United States Patent
Hämäläinen et al.

(10) Patent No.: US 7,596,167 B2
(45) Date of Patent: Sep. 29, 2009

(54) ALLOCATION METHOD, NETWORK ELEMENT, MODULE AND USER DEVICE

(75) Inventors: Jyri Hämäläinen, Oulu (FI); Esa Tiirola, Oulu (FI); Risto Wichman, Helsinki (FI)

(73) Assignee: Nokia Corporation, Espoo (FI)

( * ) Notice: Subject to any disclaimer, the term of this patent is extended or adjusted under 35 U.S.C. 154(b) by 704 days.

(21) Appl. No.: 11/324,224

(22) Filed: Jan. 4, 2006

(65) Prior Publication Data
US 2007/0019536 A1    Jan. 25, 2007

(30) Foreign Application Priority Data
Jul. 4, 2005    (FI)    ................... 20050714

(51) Int. Cl.
*H04B 1/00*    (2006.01)
(52) U.S. Cl. .............. 375/130; 375/142; 375/150; 375/343; 370/203; 370/208; 455/522
(58) Field of Classification Search ................ 375/130, 375/142, 150, 343
See application file for complete search history.

(56) References Cited

U.S. PATENT DOCUMENTS

| | | | | |
|---|---|---|---|---|
| 5,938,787 | A | 8/1999 | Stark | |
| 2004/0224725 | A1* | 11/2004 | Kim et al. | ............ 455/561 |
| 2004/0257975 | A1 | 12/2004 | Proctor, Jr. | |
| 2004/0258027 | A1 | 12/2004 | Tsybakov et al. | |
| 2006/0063505 | A1* | 3/2006 | Cairns | ............ 455/302 |

FOREIGN PATENT DOCUMENTS

| | | |
|---|---|---|
| WO | WO 99/35760 | 7/1999 |
| WO | WO 02/067454 | 8/2002 |

* cited by examiner

*Primary Examiner*—Curtis B Odom
(74) *Attorney, Agent, or Firm*—Squire, Sanders & Dempsey LLP

(57) ABSTRACT

The invention is related to a network element, comprising: means for receiving feedback information from the user device; means for creating a first orthogonality measure by using the feedback information; means for creating a second orthogonality measure by comparing transmission resources; means for transmitting information to at least one user device.

31 Claims, 3 Drawing Sheets

ALLOCATION METHOD, NETWORK ELEMENT, MODULE AND USER DEVICE

FIELD

The invention relates to an allocation method in a communication system, a network element, a module and a user device.

BACKGROUND

In many communication systems, resource allocation has a critical role in respect of transmission quality and delays in the eyes of a user (that can also be taken as a part of the transmission quality).

Especially in the systems using code division multiple access (CDMA) as a multiple access method, sharing the usually quite limited orthogonal code pools can be thought to be the one of the most important factors in using the radio interface efficiently.

The problem of the shortage of the orthogonal resources, such as codes and frequencies, becomes even worse in the future when multi-antenna techniques will be applied.

In the prior art, there are several methods for allocating transmission resources and particularly codes. One of them is a method disclosed in U.S. Ser. No. 10/324,088, where an attempt is made to solve the limitations of the code pools by using the same spreading code in a time frame for two different user devices, such as mobile phones or computers. This approach does not increase the number of codes and therefore leads easily to interference problems or even difficulties in separating users or data from each other in a CDMA system.

Another method is to introduce a secondary scrambling code. However, one problem with the secondary scrambling code is the increase in the interference that leads to a need for a higher power level.

BRIEF DESCRIPTION OF THE INVENTION

According to an aspect of the invention, there is provided an allocation method in a communication system, comprising at least one network element and at least one user device, the allocation method comprising: generating feedback information in the at least one user device and transmitting the feedback information to the network element; creating a first orthogonality measure in the network element by using the feedback information; creating a second orthogonality measure in the network element by comparing transmission resources; allocating transmission resources for the at least one user device based on the first orthogonality measure, the second orthogonality measure and a required transmission quality; and transmitting information from a network element to at least one user device.

According to an aspect of the invention, there is provided an allocation method in a communication system, comprising at least one network element and at least one user device, the allocation method comprising: extending available code space by generating non-orthogonal codes; generating feedback information in the at least one user device and transmitting the feedback information to the network element; creating a first orthogonality measure in the network element by using the feedback information; creating a second orthogonality measure in the network element by comparing transmission resources; allocating transmission resources for the at least one user device based on the first orthogonality measure, the second orthogonality measure and a required transmission quality in such a way that, in addition to orthogonal codes, the non-orthogonal codes are used; and transmitting information from the network element to the at least one user device.

According to an aspect of the invention, there is provided a network element, comprising: means for receiving feedback information from a user device; means for creating a first orthogonality measure by using the feedback information; means for creating a second orthogonality measure by comparing transmission resources; and means for transmitting information to at least one user device.

According to an aspect of the invention, there is provided a network element, comprising: means for extending an available code space by generating non-orthogonal codes; means for receiving feedback information from a user device; means for creating a first orthogonality measure by using the feedback information; means for creating a second orthogonality measure by comparing transmission resources; means for allocating transmission resources for the user device based on the first orthogonality measure, the second orthogonality measure and a required transmission quality in such a way that, in addition to orthogonal codes, the non-orthogonal codes are used; and means for transmitting information to the user device.

According to an aspect of the invention, there is provided a network element, comprising: means for extending available code space by generating non-orthogonal codes; and means for allocating transmission resources for a user device based on a received first orthogonality measure, a second orthogonality measure and a required transmission quality in such a way that, in addition to the orthogonal codes, the non-orthogonal codes are used.

According to an aspect of the invention, there is provided a module, comprising: means for extending available code space by generating non-orthogonal codes; means for creating a first orthogonality measure by using feedback information; means for creating a second orthogonality measure by comparing transmission resources; means for allocating transmission resources for the user device based on the first orthogonality measure, the second orthogonality measure and a required transmission quality in such a way that, in addition to orthogonal codes, the non-orthogonal codes are used.

According to an aspect of the invention, there is provided a module, configured to: extend available code space by generating non-orthogonal codes; create a first orthogonality measure by using feedback information; create a second orthogonality measure by comparing transmission resources; allocate transmission resources for the user device based on the first orthogonality measure, the second orthogonality measure and a required transmission quality in such a way that, in addition to orthogonal codes, the non-orthogonal codes are used.

According to an aspect of the invention, there is provided a network element, configured to: receive feedback information from the user device; create a first orthogonality measure by using the feedback information; create a second orthogonality measure by comparing transmission resources; and transmit information the user device.

According to an aspect of the invention, there is provided a network element, configured to: extend available code space by generating non-orthogonal codes; and allocate transmission resources for the user device on the basis of a received first orthogonality measure, second orthogonality measure and a required transmission quality in such a way that, in addition to the orthogonal codes, also the non-orthogonal codes are used.

According to an aspect of the invention, there is provided a user device, configured to: transmit feedback information including at least one of the following indicators:

$$A = \frac{|(w_{\max}, h)|^2}{|(w_{\min}, h)|^2 + 1},$$

$$|(w, h)| = |w_{\max,1}\overline{h}_1 + w_{\max,2}\overline{h}_2|,$$

wherein $w_{max}$ is a feedback code word giving a best Signal-to-Noise Ratio (SNR), $h(h=(h_1,h_2))$ denotes a channel vector containing impulse response vectors $h_1$ and $h_2$ corresponding to a first base station antenna and a second base station antenna, $w_{min}$ is a feedback code word giving a worst SNR, $w_{max,1}$ is a first component of vector $w_{max}$, $w_{max,2}$ is a second component of vector $w_{max}$, $\overline{h}_1$ is a complex conjugate of a first channel coefficient, $\overline{h}_2$ is a complex conjugate of a second channel coefficient, and $|x|$ denotes the absolute value of x, or $$B = \frac{|(w_{\max}, h)|^2}{|(w_{\min}, h)|^2},$$

wherein $w_{max}$ is the feedback code word giving the best SNR, $h(h=(h_1,h_2))$ denotes the channel vector containing the impulse response vectors $h_1$ and $h_2$ corresponding to the first base station antenna and the second base station antenna, $w_{min}$ is the feedback code word giving the worst SNR, and where $w_{max}$ (maximum) is selected such that $|(w_{max},h)|=\max\{|(w_{max},h)|:w$ is a quantized feedback code vector$\}$ and $(w_{min},w_{max})=0$.

According to an aspect of the invention, there is provided a user device, comprising: means for transmitting feedback information including at least one of the following indicators:

$$A = \frac{|(w_{\max}, h)|^2}{|(w_{\min}, h)|^2 + 1},$$

$$|(w, h)| = |w_{\max,1}\overline{h}_1 + w_{\max,2}\overline{h}_2|,$$

wherein $w_{max}$ is a feedback code word giving the best Signal-to-Noise Ratio (SNR), $h(h=(h_1,h_2))$ denotes a channel vector containing the impulse response vectors $h_1$ and $h_2$ corresponding to a first base station antenna and a second base station antenna, $w_{min}$ is a feedback code word giving a worst SNR, $w_{max,1}$ is a first component of vector $w_{max}$, $w_{max,2}$ is a second component of vector $w_{max}$, $\overline{h}_1$ is a complex conjugate of a first channel coefficient, $\overline{h}_2$ is a complex conjugate of a second channel coefficient, $|x|$ denotes the absolute value of x, or $$B = \frac{|(w_{\max}, h)|^2}{|(w_{\min}, h)|^2},$$

wherein $w_{max}$ is the feedback code word giving the best SNR, $h(h=(h_1,h_2))$ denotes the channel vector containing the impulse response vectors $h_1$ and $h_2$ corresponding to the first base station antenna and the second base station antenna, $w_{min}$ is the feedback code word giving the worst SNR, and where $w_{max}$ (maximum) is selected such that $|(w_{max},h)|=\max\{|(w_{max},h)|:w$ is a quantized feedback code vector$\}$ and $(w_{min},w_{max})=0$.

The invention provides several advantages. An embodiment of the invention provides means for using non-orthogonal resources, such as non-orthogonal channelization codes and non-orthogonal frequencies, in a communications system. The embodiment of the invention also provides means for expanding restricted code pools without generating addition to the interference level.

LIST OF DRAWINGS

In the following, the invention will be described in greater detail with reference to the embodiments and the accompanying drawings, in which FIG. 1 shows an example of a communication system;

DESCRIPTION OF EMBODIMENTS

Figure 1:
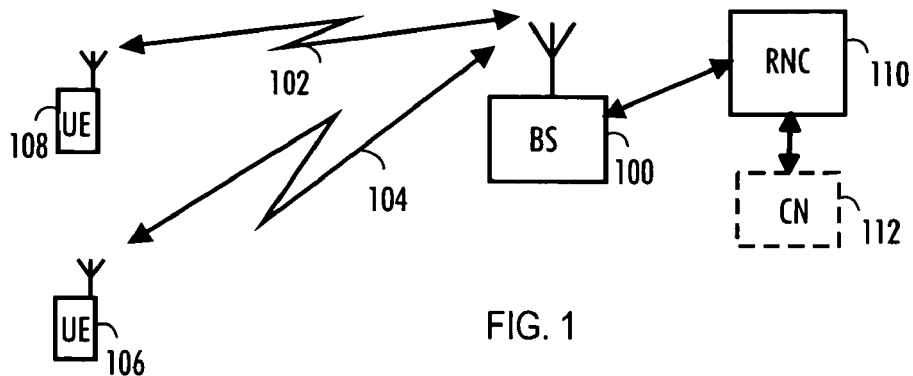

With reference to FIG. 1, we examine an example of a communication system in which embodiments of the invention can be applied. The present invention can be applied in various communication systems. One example of such a communication system is a Universal Mobile Telecommunications System (UMTS) radio access network. It is a radio access network which includes wideband code division multiple access (WCDMA) technology and can also offer real-time circuit and packet switched services. The embodiments are not, however, restricted to the systems given as examples but a person skilled in the art may apply the solution in other communication systems provided with the necessary properties.

It is clear to a person skilled in the art that embodiments of the invention can be applied to systems utilizing different modulation methods or air interface standards.

FIG. 1 is a simplified illustration of a part of a digital data transmission system to which the solution according to the invention is applicable. This is a part of a cellular radio system, which comprises a base station (or a node B) 100, which has bidirectional radio links 102 and 104 to user devices 106 and 108. The user devices may be fixed, vehicle-mounted or portable. The base station includes transceivers, for instance. From the transceivers of the base station, there is a connection to an antenna unit that establishes the bi-directional radio links to the user device. The base station is further connected to a controller 110, such as a radio network controller (RNC), which transmits the connections of the user devices to the other parts of the network. The radio network controller controls in a centralized manner several base stations connected to it. The radio network controller is further connected to a core network 112 (CN). Depending on the system, the counterpart on the CN side can be a mobile services switching centre (MSC), a media gateway (MGW) or a serving GPRS (general packet radio service) support node (SGSN).

The radio system can also communicate with other networks, such as a public switched telephone network or the Internet.

The size of communication systems can vary quite a lot according to the data transfer needs and the required coverage area.

Figure 2:
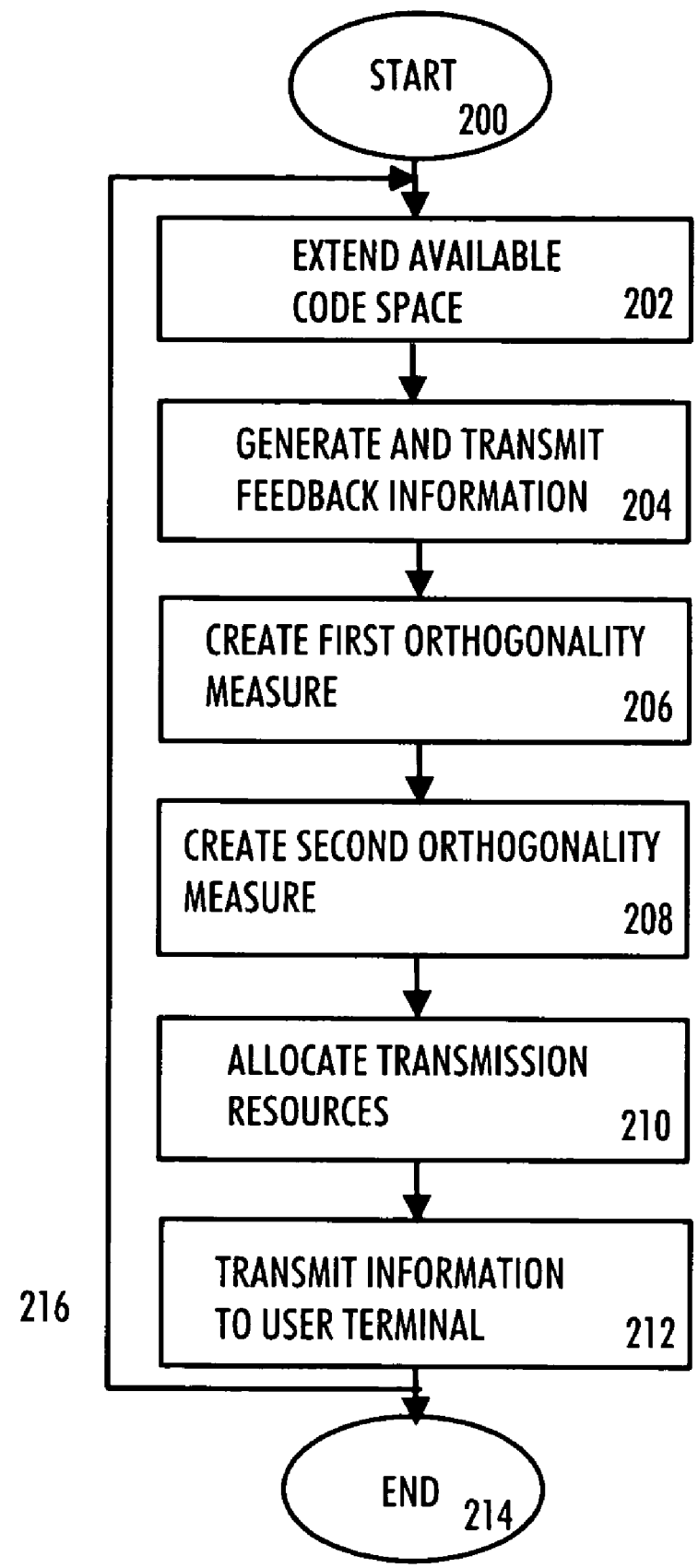
FIG. 2 is a flow chart.

Next, by means of FIG. 2, an embodiment of the allocation method is explained in further detail.

The embodiment starts in block 200.

Figure 3:
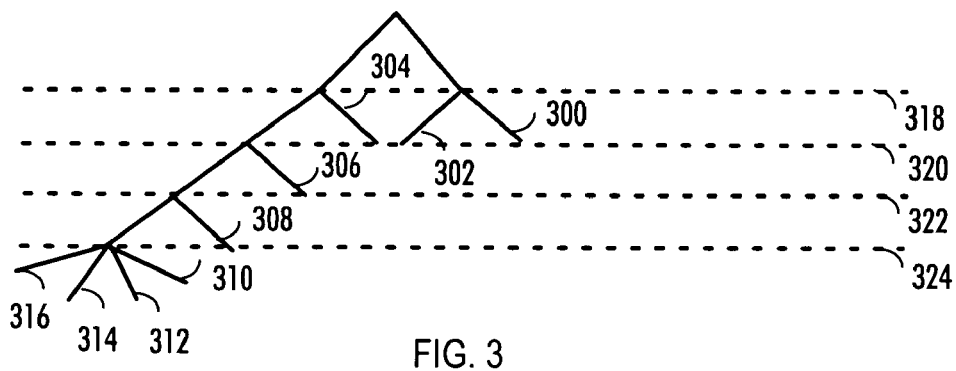
FIG. 3 illustrates an example of a channelization code tree.

In block 202, available code space is extended by generating non-orthogonal codes. An example of a code space extension is now explained with the aid of FIG. 3. FIG. 3 illustrates an example of a channelization code-tree in a Wideband Code Division Multiple Access (WCDMA) system.

In UMTS, channelization and scrambling codes used in the Uu interface (the radio interface between the UMTS terrestrial radio access network (UTRAN) and a user device) connections are managed by a radio network controller. Each cell has one primary scrambling code from which user devices can recognize the cell and under each scrambling code there is a set of channelization codes. The information sent over the Uu interface is spread with a channel-specific spreading code that in turn is performed using a scrambling code and a channelization code.

Scrambling code is typically pseudo-random and it is used to produce a randomised digital signal. The scrambling code is used in the downlink direction for cell or sector separation and in the uplink direction for user separation.

In UMTS, channelization codes are used for channel separation both in uplink and downlink directions. The channelization codes have different spreading factor values and thus different symbol rates. Typically, if a data rate is high, the spreading factor has a relatively small value. Therefore, high user data rates require more air interface code capacity.

The channelization codes are designed to be as orthogonal as possible to achieve a good channel separation. Orthogonality means in theory that codes do not correlate with each other.

In a prior art code-tree, all codes are orthogonal against each other. In an embodiment of the allocation method, the code space is extended by using non-orthogonal codes that are formed as a linear combination of the original orthogonal codes. In this application, the original codes with which the new codes are generated are called base codes. The new codes will be orthogonal against codes other than the base codes. The base codes are typically selected from the same branch of the code tree and hence they are orthogonal against the channelization codes of the other branches of the code tree. In such a case, the reduced code orthogonality will reduce the link performance only for the users having a channelization code from the code tree branch that was used for generating non-orthogonal codes.

In the example of FIG. 3, codes 300-308 are original codes and codes 310-316 are added non-orthogonal codes. On level 318 the spreading factor is 2, on level 320 the spreading factor is 4, on level 322 the spreading factor is 8 and on level 324 the spreading factor is 16. It is obvious to a skilled person that the embodiments of the allocation method are not restricted to the usage of the depicted code tree.

In block 204, feedback information is generated in the at least one user device and the feedback information is transmitted to the network element. One example of the feedback information is quantized antenna weight vectors ($w_1, w_2$). Another example is eigenvectors corresponding to eigenvalues of the channel matrix. The feedback information typically includes information also on spatial separation of the users. The spatial information may be used in antenna beam forming. The determination of the quantized antenna weight vectors or the eigenvectors is known in the prior art. Also, the determination of the spatial separation of the users is a part of the prior art. Therefore the determination methods are not explained here in further detail.

In block 206, the first orthogonality measure is created in the network element by using the feedback information.

Typically, quantized antenna weights ($w_1, w_2$) received from the user device are used for determining the first orthogonality measure in which case the distance between two code words in the space of quantized antenna weight vectors tells if the two code words are orthogonal against each other. The first orthogonality measure can be calculated as follows:

$$D_{fb}(w_1, w_2) = \frac{|(w_1, w_2)_{fb}|}{\|w_1\|_{fb}\|w_2\|_{fb}}, \qquad (1)$$

wherein $w_1$ denotes a feedback code word (quantized antenna weight vector) of user 1, $w_2$ denotes a feedback code word (quantized antenna weight vector) of user 2, $(\cdot,\cdot)_{fb}$ denotes the inner product with respect to the metric defined by $\|\cdot\|_{fb}$, and $fb$ refers to feedback.

We note that $w_1$ and $w_2$ are orthogonal if $$(w_1, w_2)_{fb} = w_{1,1}\overline{w}_{2,1} + w_{1,2}\overline{w}_{2,2} = 0,$$

where $\overline{w}_{m,1}$ is the quantized feedback corresponding to the first transmitter antenna from the mth user and $\overline{w}_{m,2}$ is the quantized feedback corresponding to the second transmitter antenna from the mth user.

The orthogonality between code words is relative to the orthogonality between the channels used by the correspondent users. Hence, the reliability of the orthogonality measure can be ensured by using proper feedback coding. A simple example of such a feedback coding is Gray-coding for signal phases. Gray-coding is known in the art.

If the feedback coding is determined already in the designing phase of the system, the values of the first orthogonality measure for different feedback combinations may be computed and stored in advance.

In block 208, a second orthogonality measure is created in the network element by comparing transmission resources.

Typically, the distance between channelization code words in the code space of two resources is determined. The second orthogonality measure can be computed as follows:

$$D_{tr}(c_1, c_2) = \frac{|(c_1, c_2)_{tr}|}{\|c_1\|_{tr}\|c_2\|_{tr}}, \qquad (2)$$

wherein $c_1$ denotes a vector containing resource information, such as channelization codes of user 1, $c_2$ denotes a vector containing resource information, such as channelization codes of user 2, $(\cdot,\cdot)_{tr}$ denotes the inner product with respect to the metric defined by $\|\cdot\|_{tr}$, and $_{tr}$ refers to a transmission.

In some circumstances, also the second orthogonality measure may be determined and stored in advance.

In block 210, transmission resources are allocated to the at least one user device on the basis of the first orthogonality measure, the second orthogonality measure and a required transmission quality in such a way that, in addition to the orthogonal codes, also the non-orthogonal codes are used. The required transmission quality may be deduced for instance on the basis of the distance between the user device and the network element.

In the resource allocation, the following measure may be used:

$$D(w_1, w_2; c_1, c_2) = u_1 D_{fb}(w_1, w_2) + u_2 D_{tr}(c_1, c_2), \quad (3)$$

where $$0 \leq u_1, u_2 \leq 1, \ u_1 + u_2 = 1,$$

wherein $w_1$ denotes a feedback code word (quantized antenna weight vector) of user 1, $w_2$ denotes a feedback code word (quantized antenna weight vector) of user 2, $c_1$ denotes a vector containing resource information, such as channelization codes of user 1, $c_2$ denotes a vector containing resource information, such as channelization codes of user 2, $D_{fb}(\ )$ is obtained from equation (1), $D_{tr}(\ )$ is obtained from equation (2), and $u_1, u_2$ denote transmission weights which depend on the performance target and the cell load. The transmission weights can be determined for instance by simulation.

The embodiment can be extended to a system where a network element, such as base station, has M (M>2) antennas. Then up to M antennas, orthogonal feedback code words are defined such that $$(w_m, w_k)_{fb} = 0, \text{ if } m \neq k, \quad (4)$$

wherein $w_m$ denotes a feedback code word (quantized antenna weight vector) of user m, $w_k$ denotes a feedback code word (quantized antenna weight vector) of user k, and $_{fb}$ refers to feedback.

The set of all feedback words may contain more than M feedback code words.

The second orthogonality measure (see equations (2) and (3)) can be extended to the case of M antennas. For the allocation, L (L≤K) users among K users may then be selected by using the measure $$D(w_1, \ldots, w_L; c_1, \ldots, c_L) = u_1 \sum_{l \neq k} D_{fb}(w_l, w_k) + u_2 \sum_{l \neq k} D_{tr}(c_l, c_k), \quad (5)$$

wherein $w_1$ denotes a feedback code word (quantized antenna weight vector) of user 1, $w_L$ denotes a feedback code word (quantized antenna weight vector) of user L, $c_1$ denotes a vector containing resource information, such as channelization codes of user 1, $c_L$ denotes a vector containing resource information, such as channelization codes of user L, $u_1, u_2$ denote transmission weights which depend on the performance target and the cell load. The transmission weights can be determined for instance by simulation;

$D_{fb}(\ )$ is obtained from equation (1), $w_l$ denotes a feedback code word (quantized antenna weight vector) of user l, $w_k$ denotes a feedback code word (quantized antenna weight vector) of user k, $D_{tr}(\ )$ is obtained from equation (2), $c_l$ denotes a vector containing resource information, such as channelization codes of user l, $c_k$ denotes a vector containing resource information, such as channelization codes of user k, Σ refers to a summing operation.

In one embodiment, the generated non-orthogonal codes are allocated to the users on the basis of the measured path losses or known distances between users and a network element.

The benefit achieved by this is that only relatively low transmission powers are needed even when data rates are relatively high. Also, codes of the users that are near the network element are still orthogonal against the codes of the users that are located near the cell edge (far from the network element). Therefore, users requiring low transmission power from the network element have orthogonal codes compared to users requiring high transmission power from the network element. Since non-orthogonal codes are applied only near the base station, the required increase in the network element's transmission power compensating for the reduced code orthogonality does not create a significant increase in the interference of the system.

The embodiment does not only suit to resource allocation for several users but also for resource allocation for one user. That is to say, non-orthogonal codes may be used by a single user. One example: if the feedback consists of eigenvectors corresponding to eigenvalues of the channel matrix, the transmission weights for data channels can be determined as a linear combination of the two best eigenvectors in the manner that channel power response is the same for both data channels. The transmission weights are no longer necessarily orthogonal, but this can be compensated for by using non-orthogonal channelization codes.

The information typically also includes information on spatial separation of the users. The spatial information may be used in antenna beam forming.

In block 212, information on resource allocation is transmitted from a network element to at least one user device.

Typical situation where the embodiment is implemented is a cellular radio network or another wireless network, there the network element, for instance a base station or node B, transmits simultaneously to several user devices. In the example depicted in further detail in this application, the information includes one or more quantized antenna weight vectors.

The method ends in block 214. The arrow 216 depicts one possibility of repeating the embodiment.

The feedback information the user device transmits to the network element (block 204) may also include different indicators.

One example of such an indicator is the Signal-to-Noise and Interference Ratio (SNIR):

$$A = \frac{|(w_{max}, h)|^2}{|(w_{min}, h)|^2 + 1}, \quad (6)$$

$$|(w, h)| = |w_{max,1}\bar{h}_1 + w_{max,2}\bar{h}_2|,$$

wherein $w_{max}$ is the feedback code word giving the best Signal-to-Noise Ratio, $h(h=(h_1,h_2))$ denotes a channel vector containing the impulse response vectors $h_1$ and $h_2$ corresponding to the first and the second base station antenna, $w_{min}$ is the feedback code word giving the worst Signal-to-Noise Ratio, $w_{max,1}$ is the first component of vector $w_{max}$, $w_{max,2}$ is the second component of vector $w_{max}$, $\bar{h}_1$ is the complex conjugate of the first channel coefficient, $\bar{h}_2$ is the complex conjugate of the second channel coefficient,

|x| denotes the absolute value of x.

Another example of such an indicator is the Signal-to-Interference Ratio (SIR):

$$B = \frac{|(w_{max}, h)|^2}{|(w_{min}, h)|^2}, \quad (7)$$

wherein $w_{max}$ is the feedback code word giving the best SNR, $h(h=(h_1,h_2))$ denotes a channel vector containing the impulse response vectors $h_1$ and $h_2$ corresponding to the first and the second base station antenna, $w_{min}$ is the feedback code word giving the worst SNR, and where $w_{max}$ (maximum) is selected such that $|(w_{max},h)|=\max\{|(w_{max},h)|:w$ is a quantized feedback code vector$\}$ and $(w_{min},w_{max})=0$ The network element is then able to make the resource allocation decision for $w_1,A_1$, (first user) and for $w_2,A_2$ (second user) according to rule:

$$A_1+A_2=\max\{A_k+A_l:(w_k,w_l)=0, k\neq l\}, \quad (8)$$

wherein max refers to maximum, $A_k$ denotes indicator A for user k, $A_l$ denotes indicator A for user l, $w_k$ is the feedback code word for the kth user, $w_l$ is the feedback code word for the kth user, where k and l go through all the user indices. In the equation, indicator B can be used instead of indicator A.

Figure 4:
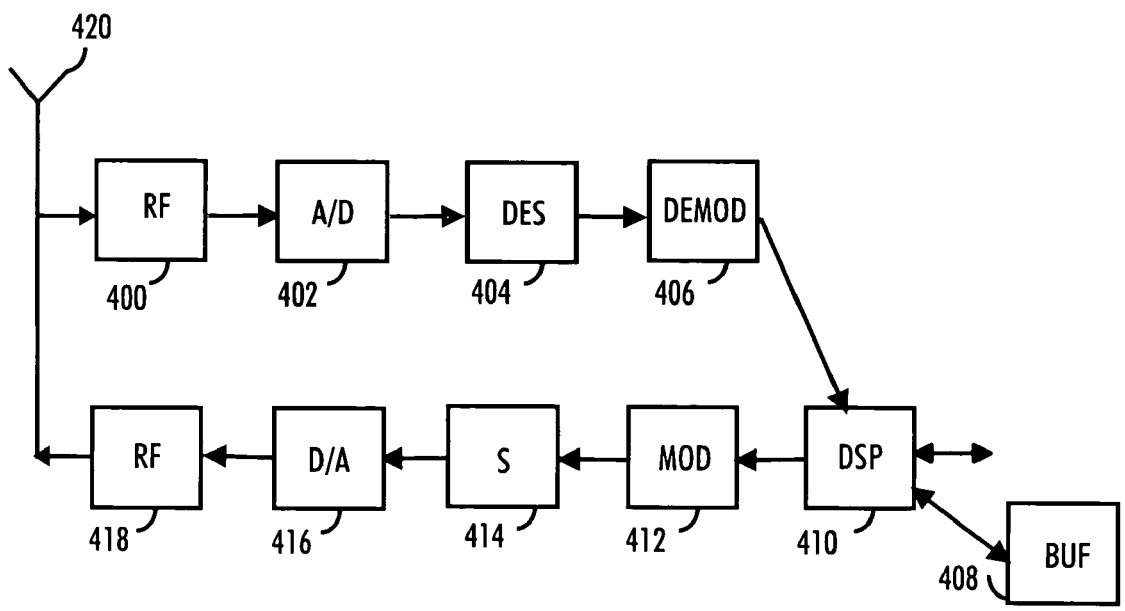
FIG. 4 illustrates an example of a network element.
Figure 5:
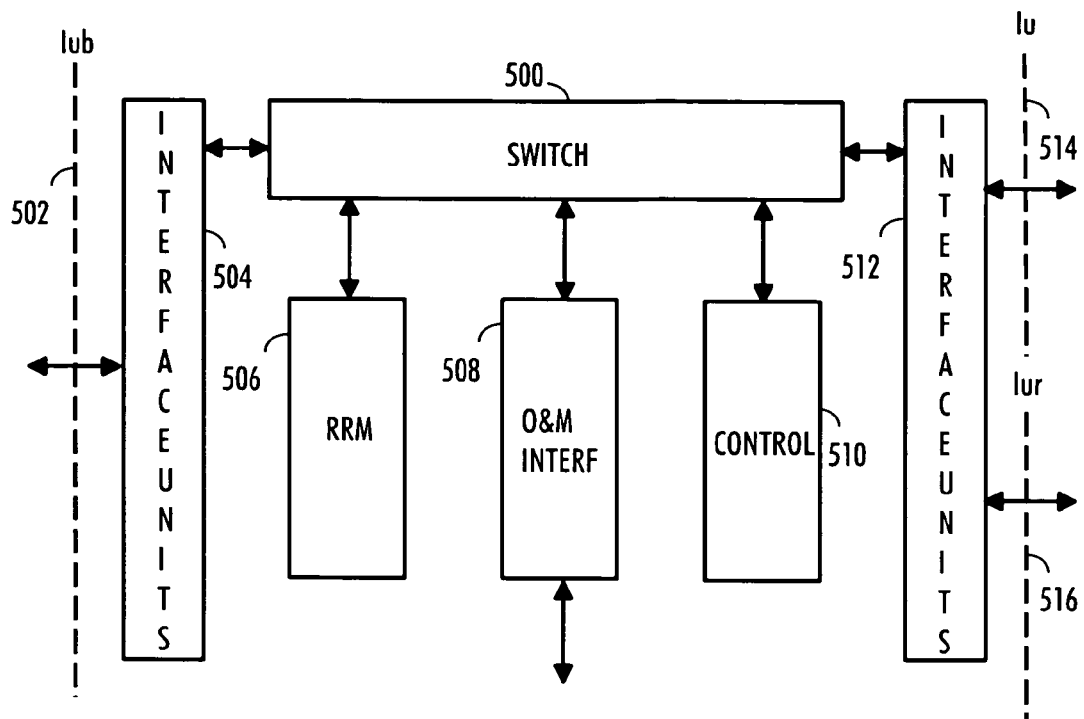
FIG. 5 illustrates another example of a network element.

Next, examples of network elements are described by means of FIGS. 4 and 5.

FIG. 4 illustrates a simplified exemplary embodiment of a network element in relation to the functionalities required by the allocation method described above. It is obvious to a person skilled in the art that the network element can deviate from what is depicted in FIG. 4, for instance according to a modulation method used. The network element illustrated in FIG. 4 is a base station (or node B).

In FIG. 4, blocks 412 to 418 describe a transmitter and blocks 400 to 406 a receiver. The example of FIG. 4 shows the radio parts of the transmitter and the receiver as separate, but they may also be combined. A signal-processing block 410 describes the hardware parts of the base station required for generating user speech or data in the transmitter. There may be one signal processing block, such as in the example of the figure, or a separate one for the transmitter and the receiver.

Signal processing, which includes channel coding, is usually implemented in a DSP processor 410 (DSP=Digital Signal Processing). The aim of channel coding is to make sure that the information transmitted can be restored in the receiver, although not every information bit could be received properly.

In block 412, the signal is modulated using the desired modulation method. Block 414 describes multiplication by a spreading code performed on the information to be transmitted in direct sequence spread spectrum systems and used to spread a narrowband signal into wideband. In an embodiment of the invention, the code used in spreading may also be the same as the code indicating the information transfer zone in routing. Modulation and spreading may also be a part of the DSP processor.

The signal is converted from digital into analog form in block 416. In RF parts 418, the signal is up-converted to the selected transmission frequency either directly or via an intermediate frequency, amplified and filtered, if necessary.

In the example of the figure, the transmitter and the receiver share the same antenna 420, whereby a duplex filter is required to separate a signal to be transmitted and a signal to be received from each other. The antenna may be an individual antenna or an array antenna composed of several antenna elements.

The receiver comprises RF parts 400, where a received signal is filtered, down-converted either directly to base band or to an intermediate frequency, and amplified. In block 402, the signal is converted from analog into digital by sampling and quantizing; in block 404, the direct spread wideband signal is despread by multiplication by a code sequence generated by a code generator; in block 406, the effect of the data modulation is removed by demodulation; and, in block 412, necessary signal processing is performed, such as de-interleaving, decoding and decryption.

Block 408 is a buffer memory, where location and other data can be stored about the devices belonging to the system at each particular moment.

In the exemplary network element of FIG. 4, certain steps of the embodiment of the resource allocation method, such as the determination of the first and the second orthogonality measure, are mainly carried out in the DSP processor. The network element of FIG. 4 (base station) may also in some implementations carry out the resource allocation to the user devices.

It is also possible to produce a module that can take care of allocating transmission resources for the user device on the basis of the first orthogonality measure, the second orthogonality measure and a required transmission quality.

The disclosed functionalities of the embodiments of the invention can be advantageously implemented by means of software in appropriate parts of a network element. Other implementation solutions are also possible, such as different hardware implementations, e.g. a circuit built of separate logics components or one or more client-specific integrated circuits (Application-Specific Integrated Circuit, ASIC). A hybrid of these implementations is also feasible.

FIG. 5 illustrates another simplified exemplary embodiment of a network element in relation to the functionalities required by the allocation method described above. It is obvious to a person skilled in the art that the network element can deviate from what is depicted in FIG. 5.

Referring to FIG. 5, a simplified block diagram illustrates an example of the radio network controller's (RNC) logical structure. A radio network controller is taken herein as an example of a network element. Both the source RNC and the target RNC may have the logical structure depicted in the example.

RNC is the switching and controlling element of UTRAN. The switching 500 takes care of connections between the core network and the user device. The radio network controller is located between Iub 502 and Iu 514 interfaces. The network controller is connected to these interfaces via interface units 504, 512. There is also an interface for inter-RNC transmission called Iur 516.

The functionality of the radio network controller can be classified into two classes: UTRAN radio resource management 506 and control functions 510. An operation and management interface function 508 serves as a medium for information transfer to and from network management functions.

The radio resource management is a group of algorithms used to share and manage the radio path connection so that the quality and capacity of the connection are adequate. The most important radio resource management algorithms are handover control, power control, admission control, packet scheduling, and code management.

The UTRAN control functions take care of functions related to the setup, maintenance and release of a radio connection between the base stations and the user devices. Therefore, the embodiments of the hard handover method described above are typically carried out in a radio resource management block 506 and UTRAN control block 510. Radio resource management block 506 and control functions block 510 can be combined for forming a radio resource control (RRC) unit of a serving radio network controller (SRNC-RRC).

The precise implementation of the radio network controller (RNC) is vendor-dependent.

In the exemplary network element of FIG. 5, the main steps of the embodiment of the resource allocation method, such as the determination of the first and the second orthogonality measure and/or the resource allocation, are mainly carried out in the radio resource management block 506 and control functions block 510. The radio resource management block and/or the control functions block typically carries out the extending of the available code space by generating non-orthogonal codes.

Most of the functionalities of the embodiments of the invention can be advantageously implemented by means of software in appropriate parts of a network element.

Other implementation solutions are also possible, such as different hardware implementations, e.g. a circuit built of separate logics components or one or more client-specific integrated circuits (Application-Specific Integrated Circuit, ASIC). A hybrid of these implementations is also feasible. The embodiments may be implemented as a module including hardware and/or software.

Figure 6:
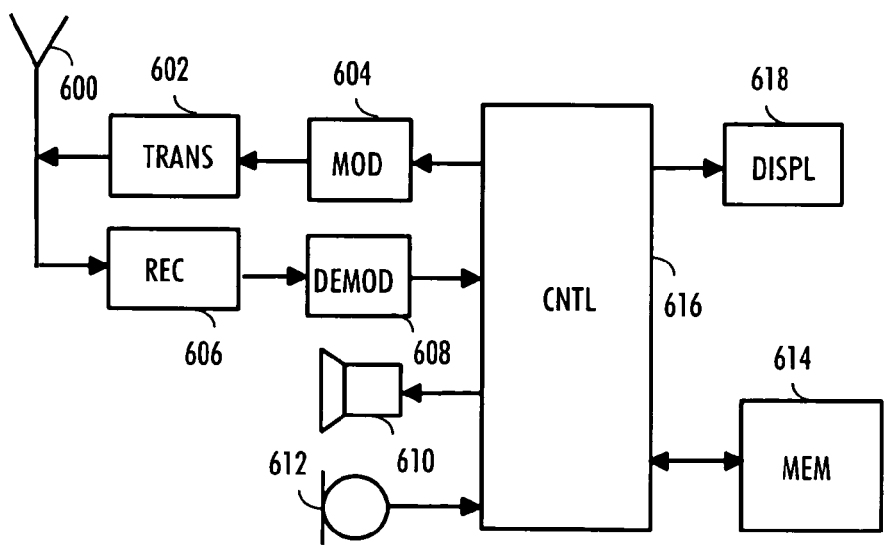
FIG. 6 illustrates an example of a user device.

FIG. 6 illustrates a simplified exemplary embodiment of a user device in relation to the functionalities required by the allocation method described above. It is obvious to a person skilled in the art that the user device can deviate from what is depicted in FIG. 6. The user device illustrated in FIG. 6 is a user device of a wireless communication system.

The user device can be, for example, a portable phone, a card phone or a microcomputer without being limited to these. The above-mentioned user device or the user device unit comprises an antenna 600, by means of which signals are usually both transmitted and received via a duplex filter. The transmitter and the receiver may also have separate antennas, in which case no duplex filter is needed.

The user device includes a transmitter 602, which amplifies a modulated signal and transmits it to the antenna. The transmitter also includes e.g. D/A converters, which convert a digital signal into an analogue signal, and filters which in systems with a limited bandwidth restrict the bandwidth of the output. Which transmitter components, such as amplifiers, D/A converters and filter, or operations, such as various base band operations, are common to both transmitters and which are separate varies depending on the application and/or implementation.

The user device also includes a modulator 604, which modulates the carrier wave with a data signal including the desired information according to the desired modulation method.

The user device further includes a receiver 606, which amplifies a signal arriving from the antenna and down-converts it to a selected intermediate frequency or directly to the base band. The user device also includes e.g. A/D converters, which convert an analogue signal into a digital signal by sampling and quantisizing a base band signal, and filters, which filter out frequencies outside the desired frequency band. Which receiver components, such as amplifiers, A/D converters and filters, or operations, such as various base band operations, are common to both transmitters and which are separate varies depending on the application and/or implementation.

The user device also comprises a demodulator 608, which demodulates a received signal so that a data signal can be separated from the carrier wave. The demodulator can also be included in the receiver.

The controller part 616 of the user device comprises e.g. controlling and calculating means for controlling the operation of the different parts of the user device and means for processing the user's speech or the data generated by the user, such as a DSP processor (Digital Signal Processing), which comprises e.g. channel equalizing operations for compensating for the interference caused in the signal by the radio channel, and coding and decoding means which perform both channel coding and speech coding. The generating of the indicators A and B (explained earlier in the description) is typically carried out in the DSP processor.

Furthermore, in spread-spectrum systems, such as the WCDMA, the signal spectrum is spread onto a broad band in the transmitter using a pseudo-random spreading code, and in the receiver it is compiled to increase the channel capacity. Coding can also be used for encrypting the output or the information included therein.

The user interface of the user device comprises a loudspeaker or an earpiece 610, a microphone 612, a display 618 and possibly a keypad, which are connected to the controller part. The user device or the user device unit also comprises different memory elements, which are illustrated as one functional block 614. The memory element includes a program for controlling the function of the user device, for example.

Other implementation solutions are also possible, such as different hardware implementations, e.g. a circuit built of separate logics components or one or more client-specific integrated circuits (Application-Specific Integrated Circuit, ASIC). A hybrid of these implementations is also feasible. The embodiments may be implemented as a module including hardware and/or software.

Even though the invention is described above with reference to an example according to the accompanying drawings, it is clear that the invention is not restricted thereto but it can be modified in several ways within the scope of the appended claims.

The invention claimed is:

1. An allocation method in a communication system comprising at least one network element and at least one user device, the allocation method comprising:
generating feedback information in the at least one user device and transmitting the feedback information to the network element;
creating a first orthogonality measure in the network element by using the feedback information;
creating a second orthogonality measure in the network element by comparing transmission resources;
allocating transmission resources for the at least one user device based on the first orthogonality measure, the second orthogonality measure, and a required transmission quality; and
transmitting information from the network element to at least one user device.

2. An allocation method in a communication system comprising at least one network element and at least one user device, the allocation method comprising:
extending available code space by generating non-orthogonal codes;
generating feedback information in the at least one user device and transmitting the feedback information to the network element;
creating a first orthogonality measure in the network element by using the feedback information;
creating a second orthogonality measure in the network element by comparing transmission resources;
allocating transmission resources for the at least one user device based on the first orthogonality measure, the second orthogonality measure, and a required transmission quality in such a way that, in addition to orthogonal codes, the non-orthogonal codes are used; and
transmitting information from the network element to the at least one user device.

3. The method of claim 2, wherein the feedback information includes a quantized antenna weight vector.

4. The method of claim 2, further comprising:
extending the code space by using non-orthogonal codes that are formed as a linear combination of the orthogonal codes.

5. The method of claim 2, further comprising:
extending the code space in such a way that the non-orthogonal codes are formed as a linear combination of the orthogonal codes and codes used for the linear combination are selected from a same branch of a code tree.

6. The method of claim 2, wherein the information transmitted from the network element includes a quantized antenna weight vector.

7. The method of claim 2, further comprising:
obtaining the first orthogonality measure by using the following equation:

$$D_{fb}(w_1, w_2) = \frac{|(w_1, w_2)_{fb}|}{\|w_1\|_{fb}\|w_2\|_{fb}},$$

wherein
$w_1$ denotes a feedback code word (quantized antenna weight vector) of user 1,
$w_2$ denotes a feedback code word (quantized antenna weight vector) of user 2,
$(\cdot,\cdot)_{fb}$ denotes an inner product with respect to a metric defined by $\|\cdot\|_{fb}$, and
$_{fb}$ refers to a feedback.

8. The method of claim 2, further comprising:
obtaining the second orthogonality measure by using the following equation:

$$D_{tr}(c_1, c_2) = \frac{|(c_1, c_2)_{tr}|}{\|c_1\|_{tr}\|c_2\|_{tr}},$$

wherein
$c_1$ denotes a vector containing resource information comprising channelization codes of user 1,
$c_2$ denotes a vector containing resource information comprising channelization codes of user 2,
$(\cdot,\cdot)_{tr}$ denotes an inner product with respect to the metric defined by $\|\cdot\|_{tr}$ and
$_{tr}$ refers to a transmission.

9. The method of claim 2, wherein required transmission quality is deduced based on distance between the user device and the network element.

10. The method of claim 2, further comprising:
using for transmission resource allocation the following measure:

$$D(w_1, \ldots, w_L; c_1, \ldots, c_L) = u_1 \sum_{l \neq k} D_{fb}(w_l, w_k) + u_2 \sum_{l \neq k} D_{tr}(c_l, c_k),$$

where $$0 \leq u_1, u_2 \leq 1, u_1 + u_2 = 1,$$

wherein
$w_1$ denotes a feedback code word of user 1,
$w_2$ denotes a feedback code word of user 2,
$c_1$ denotes a vector containing resource information comprising channelization codes of user 1,
$c_2$ denotes a vector containing resource information comprising channelization codes of user 2,
$D_{fb}$ is obtained from the following equation:

$$D_{fb}(w_1, w_2) = \frac{|(w_1, w_2)_{fb}|}{\|w_1\|_{fb}\|w_2\|_{fb}},$$

wherein
$w_1$ denotes a feedback code word (quantized antenna weight vector) of user 1,
$w_2$ denotes a feedback code word (quantized antenna weight vector) of user 2,
$(\cdot,\cdot)_{fb}$ denotes an inner product with respect to a metric defined by $\|\cdot\|_{fb}$, and
$_{fb}$ refers to a feedback,
$D_{tr}$ is obtained from the following equation:

$$D_{tr}(c_1, c_2) = \frac{|(c_1, c_2)_{tr}|}{\|c_1\|_{tr}\|c_2\|_{tr}},$$

wherein
$c_1$ denotes a vector containing resource information comprising channelization codes of user 1, c$_2$ denotes a vector containing resource information comprising channelization codes of user 2, $(\cdot,\cdot)_{tr}$ denotes an inner product with respect to the metric defined by $\|\cdot\|_{tr}$ and $_{tr}$ refers to a transmission, and u$_1$,u$_2$ denote transmission weights which depend on the performance target and a cell load.

11. The method of claim 2, further comprising:

using for transmission resource allocation the following measure:

$$D(w_1, \ldots, w_L; c_1, \ldots, c_L) = u_1 \sum_{l \neq k} D_{fb}(w_l, w_k) + u_2 \sum_{l \neq k} D_{tr}(c_l, c_k),$$

wherein w$_1$ denotes a feedback code word (quantized antenna weight vector) of user 1, w$_L$ denotes a feedback code word (quantized antenna weight vector) of user L, c$_1$ denotes a vector containing resource information comprising channelization codes of user 1, c$_L$ denotes a vector containing resource information comprising channelization codes of user L, u$_1$,u$_2$ denote transmission weights which depend on a performance target and a cell load;

D$_{fb}$( ) is obtained from the following equation:

$$D_{fb}(w_1, w_2) = \frac{|(w_1, w_2)_{fb}|}{\|w_1\|_{fb} \|w_2\|_{fb}},$$

wherein w$_1$ denotes a feedback code word (quantized antenna weight vector) of user 1, w$_2$ denotes a feedback code word (quantized antenna weight vector) of user 2, $(\cdot,\cdot)_{fb}$ denotes an inner product with respect to a metric defined by $\|\cdot\|_{fb}$, and $_{fb}$ refers to a feedback, w$_l$ denotes a feedback code word (quantized antenna weight vector) of user l, w$_k$ denotes a feedback code word (quantized antenna weight vector) of user k, D$_{tr}$( ) is obtained from the following equation:

$$D_{tr}(c_1, c_2) = \frac{|(c_1, c_2)_{tr}|}{\|c_1\|_{tr} \|c_2\|_{tr}},$$

wherein c$_1$ denotes a vector containing resource information comprising channelization codes of user 1, c$_2$ denotes a vector containing resource information comprising channelization codes of user 2, $(\cdot,\cdot)_{tr}$ denotes an inner product with respect to the metric defined by $\|\cdot\|_{tr}$ and $_{tr}$ refers to a transmission, c$_l$ denotes a vector containing resource information comprising channelization codes of user l, c$_k$ denotes a vector containing resource information comprising channelization codes of user k, and Σ refers to a summing operation.

12. The method of claim 2, wherein the allocation of the non-orthogonal codes is based on measured path losses or known distances between users and a network element.

13. The method of claim 2, wherein the feedback information comprises at least one of the following indicators:

$$A = \frac{|(w_{max}, h)|^2}{|(w_{min}, h)|^2 + 1},$$

$$|(w, h)| = |w_{max,1} \bar{h}_1 + w_{max,2} \bar{h}_2|,$$

wherein w$_{max}$ is a feedback code word giving a best Signal-to-Noise Ratio, (SNR), h(h=(h$_1$,h$_2$)) denotes a channel vector containing impulse response vectors h$_1$ and h$_2$ corresponding to a first base station antenna and a second base station antenna, w$_{min}$ is a feedback code word giving a worst SNR, w$_{max,1}$ is a first component of vector w$_{max}$, w$_{max,2}$ is a second component of vector w$_{max}$, $\bar{h}_1$ is a complex conjugate of a first channel coefficient, $\bar{h}_2$ is a complex conjugate of a second channel coefficient, and

|x| denotes the absolute value of x, or $$B = \frac{|(w_{max}, h)|^2}{|(w_{min}, h)|^2},$$

wherein w$_{max}$ is the feedback code word giving a best SNR, h(h=(h$_1$,h$_2$)) denotes the channel vector containing the impulse response vectors h$_1$ and h$_2$ corresponding to a first base station antenna and a second base station antenna, w$_{min}$ is the feedback code word giving a worst SNR, and where w$_{max}$ (maximum) is selected such that

|(w$_{max}$,h)|=max{|(w$_{max}$,h)|:w is a quantized feedback code vector} and (w$_{min}$,w$_{max}$)=0.

14. The method of claim 2, further comprising making a resource allocation decision for w$_1$,A$_1$ (first user) and for w$_2$,A$_2$ (second user) according to rule:

$$A_1 + A_2 = \max\{A_k + A_l : (w_k, w_l) = 0, k \neq l\},$$

wherein max refers to maximum,

A$_k$ denotes indicator A for a kth user,

A$_l$ denotes indicator A for an lth user, w$_k$ is a feedback code word for kth user, w$_l$ is a feedback code word for the lth user, and where k and l go through user indices.

15. A network element comprising:

means for extending an available code space by generating non-orthogonal codes;

means for receiving feedback information from a user device;

means for creating a first orthogonality measure by using the feedback information;

means for creating a second orthogonality measure by comparing transmission resources;

means for allocating transmission resources for the user device based on the first orthogonality measure, the second orthogonality measure and a required transmission quality in such a way that, in addition to orthogonal codes, the non-orthogonal codes are used; and
means for transmitting information to the user device.

16. A network element comprising:
means for extending available code space by generating non-orthogonal codes; and
means for allocating transmission resources for a user device based on a received first orthogonality measure, a second orthogonality measure, and a required transmission quality in such a way that, in addition to orthogonal codes, the non-orthogonal codes are used.

17. The network element of claim 15, wherein the feedback information includes a quantized antenna weight vector.

18. The network element of claim 15, further comprising:
means for extending the code space in such a way that the non-orthogonal codes are formed as a linear combination of the orthogonal codes and codes used for the linear combination are selected from a same branch of the code tree.

19. The network element of claim 15, further comprising:
means for transmitting information including a quantized antenna weight vector.

20. The network element of claim 15, further comprising:
means for obtaining the first orthogonality measure by using the following equation:

$$D_{fb}(w_1, w_2) = \frac{|(w_1, w_2)_{fb}|}{\|w_1\|_{fb}\|w_2\|_{fb}},$$

wherein
$w_1$ denotes a feedback code word (quantized antenna weight vector) of user 1,
$w_2$ denotes a feedback code word (quantized antenna weight vector) of user 2,
$(\cdot,\cdot)_{fb}$ denotes an inner product with respect to a metric defined by $\|\cdot\|_{fb}$, and
$_{fb}$ refers to a feedback.

21. The network element of claim 15, further comprising means for obtaining the second orthogonality measure by using the following equation:

$$D_{tr}(c_1, c_2) = \frac{|(c_1, c_2)_{tr}|}{\|c_1\|_{tr}\|c_2\|_{tr}},$$

wherein
$c_1$ denotes a vector containing resource information comprising channelization codes of user 1,
$c_2$ denotes a vector containing resource information comprising channelization codes of user 2,
$(\cdot,\cdot)_{tr}$ denotes an inner product with respect to the metric defined by $\|\cdot\|_{tr}$, and
$_{tr}$ refers to a transmission.

22. The network element of claim 15, further comprising:
means for deducing required transmission quality based on a distance between the user device and the network element.

23. The network element of claim 15, further comprising means for allocating the transmission resources by using the following measure:

$$D(w_1, \ldots, w_L; c_1, \ldots, c_L) = u_1 \sum_{l \neq k} D_{fb}(w_l, w_k) + u_2 \sum_{l \neq k} D_{tr}(c_l, c_k),$$

where $0 \leq u_1, u_2 \leq 1,\ u_1 + u_2 = 1,$ wherein
$w_1$ denotes a feedback code word of user 1,
$w_2$ denotes a feedback code word of user 2,
$c_1$ denotes a vector containing resource information comprising channelization codes of user 1,
$c_2$ denotes a vector containing resource information comprising channelization codes of user 2,
$D_{fb}$ is obtained from the following equation:

$$D_{fb}(w_1, w_2) = \frac{|(w_1, w_2)_{fb}|}{\|w_1\|_{fb}\|w_2\|_{fb}},$$

wherein
$w_1$ denotes a feedback code word (quantized antenna weight vector) of user 1,
$w_2$ denotes a feedback code word (quantized antenna weight vector) of user 2,
$(\cdot,\cdot)_{fb}$ denotes an inner product with respect to a metric defined by $\|\cdot\|_{fb}$, and
$_{fb}$ refers to a feedback,
$D_{tr}$ is obtained from the following equation:

$$D_{tr}(c_1, c_2) = \frac{|(c_1, c_2)_{tr}|}{\|c_1\|_{tr}\|c_2\|_{tr}},$$

wherein
$c_1$ denotes a vector containing resource information comprising channelization codes of user 1,
$c_2$ channelization denotes a vector containing resource information comprising channelization codes of user 2,
$(\cdot,\cdot)_{tr}$ denotes an inner product with respect to the metric defined by $\|\cdot\|_{tr}$, and
$_{tr}$ refers to a transmission, and
$u_1, u_2$ denote transmission weights which depend on the performance target and a cell load.

24. The network element of claim 15 further comprising means for allocating the transmission resources by using the following measure:

$$D(w_1, \ldots, w_L; c_1, \ldots, c_L) =$$
$$u_1 \sum_{l \neq k} D_{fb}(w_l, w_k) + u_2 \sum_{l \neq k} D_{tr}(c_l, c_k),$$

wherein
$w_1$ denotes a feedback code word (quantized antenna weight vector) of user 1,
$w_L$ denotes a feedback code word (quantized antenna weight vector) of user L,
$c_1$ denotes a vector containing resource information comprising channelization codes of user 1,
$c_L$ denotes a vector containing resource information comprising channelization codes of user L, $u_1, u_2$ denote transmission weights which depend on the performance target and a cell load, $D_{fb}(\ )$ is obtained from the following equation:

$$D_{fb}(w_1, w_2) = \frac{|(w_1, w_2)_{fb}|}{\|w_1\|_{fb}\|w_2\|_{fb}},$$

wherein $w_1$ denotes a feedback code word (quantized antenna weight vector) of user 1, $w_2$ denotes a feedback code word (quantized antenna weight vector) of user 2, $(\cdot,\cdot)_{fb}$ denotes an inner product with respect to a metric defined by $\|\cdot\|_{fb}$, and $_{fb}$ refers to a feedback, $w_l$ denotes a feedback code word (quantized antenna weight vector) of user l, $w_k$ denotes a feedback code word (quantized antenna weight vector) of user k, $D_{tr}(\ )$ is obtained from the following equation:

$$D_{tr}(c_1, c_2) = \frac{|(c_1, c_2)_{tr}|}{\|c_1\|_{tr}\|c_2\|_{tr}},$$

wherein $c_1$ denotes a vector containing resource information comprising channelization codes of user 1, $c_2$ denotes a vector containing resource information comprising channelization codes of user 2, $(\cdot,\cdot)_{tr}$ denotes an inner product with respect to the metric defined by $\|\cdot\|_{tr}$ and $_{tr}$ refers to a transmission, $c_l$ denotes a vector containing resource information comprising channelization codes of user l, $c_k$ denotes a vector containing resource information comprising channelization codes of user k, and $\Sigma$ refers to a summing operation.

25. The network element of claim 15, further comprising:

means for allocating the non-orthogonal codes based on measured path losses or known distances between users and the network element.

26. The network element of claim 15, the network element further comprising:

means for making a resource allocation decision for $w_1, A_1$ (first user) and for $w_2, A_2$ (second user) according to rule:

$$A_1 + A_2 = \max\{A_k + A_l : (w_k, w_l) = 0, k \neq l\},$$

wherein max refers to maximum, $A_k$ denotes indicator A for a kth user, $A_l$ denotes indicator A for an lth user, $w_k$ is a feedback code word for a kth user, $w_l$ is a feedback code word for the lth user, and k and l go through user indices.

27. A module comprising:

means for extending available code space by generating non-orthogonal codes;

means for creating a first orthogonality measure by using feedback information;

means for creating a second orthogonally measure by comparing transmission resources;

means for allocating transmission resources for a user device based on the first orthogonality measure, the second orthogonality measure, and a required transmission quality in such a way that, in addition to orthogonal codes, the non-orthogonal codes are used.

28. A module configured to:

extend available code space by generating non-orthogonal codes;

create a first orthogonality measure by using feedback information;

create a second orthogonality measure by comparing transmission resources;

allocate transmission resources for a user device based on the first orthogonality measure, the second orthogonality measure, and a required transmission quality in such a way that, in addition to orthogonal codes, the non-orthogonal codes are used.

29. A network element configured to:

extend available code space by generating non-orthogonal codes; and allocate transmission resources for the user device on the basis of a received first orthogonality measure, second orthogonality measure and a required transmission quality in such a way that, in addition to the orthogonal codes, also the non-orthogonal codes are used.

30. A user device configured to:

transmit feedback information including at least one of the following indicators:

$$A = \frac{|(w_{\max}, h)|^2}{|(w_{\min}, h)|^2 + 1},$$

$$|(w, h)| = |w_{\max,1}\bar{h}_1 + w_{\max,2}\bar{h}_2|,$$

wherein $w_{max}$ is a feedback code word giving the best Signal-to-Noise Ratio (SNR), $h(h=(h_1,h_2))$ denotes a channel vector containing impulse response vectors $h_1$ and $h_2$ corresponding to a first base station antenna and a second base station antenna, $w_{min}$ is a feedback code word giving the worst SNR, $w_{max,1}$ is a first component of vector $w_{max}$, $w_{max,2}$ is a second component of vector $w_{max}$, $\bar{h}_1$ is a complex conjugate of a first channel coefficient, $\bar{h}_2$ is a complex conjugate of a second channel coefficient, and

|x| denotes the absolute value of x, or $$B = \frac{|(w_{\max}, h)|^2}{|(w_{\min}, h)|^2},$$

wherein $w_{max}$ is the feedback code word giving the best SNR, $h(h=(h_1,h_2))$ denotes the channel vector containing the impulse response vectors $h_1$ and $h_2$ corresponding to the first base station antenna and the second base station antenna, $w_{min}$ is the feedback code word giving the worst SNR,
and where $w_{max}$ (maximum) is selected such that $$|(w_{max}, h)| = \max\{|(w_{max}, h)| : w$$

is a quantized feedback code vector}
and $$(w_{min}, w_{max}) = 0.$$

31. A user device comprising:
means for transmitting feedback information including at least one of the following indicators:

$$A = \frac{|(w_{\max}, h)|^2}{|(w_{\min}, h)|^2 + 1},$$

$$|(w, h)| = |w_{max,1}\bar{h}_1 + w_{max,2}\bar{h}_2|,$$

wherein
$w_{max}$ is a feedback code word giving the best Signal-to-Noise Ratio (SNR),
$h(h=(h_1,h_2))$ denotes a channel vector containing impulse response vectors $h_1$ and $h_2$ corresponding to a first base station antenna and a second base station antenna,
$w_{min}$ is a feedback code word giving the worst SNR,
$w_{max,1}$ is a first component of vector $w_{max}$,
$w_{max,2}$ is a second component of vector $w_{max}$,
$\bar{h}_1$ is a complex conjugate of a first channel coefficient,
$\bar{h}_2$ is a complex conjugate of a second channel coefficient,
|x| denotes the absolute value of x,
or $$B = \frac{|(w_{\max}, h)|^2}{|(w_{\min}, h)|^2},$$

wherein
$w_{max}$ is the feedback code word giving the best SNR,
$h(h=(h_1,h_2))$ denotes the channel vector containing the impulse response vectors $h_1$ and
$h_2$ corresponding to the first base station antenna and the second base station antenna,
$w_{min}$ is the feedback code word giving the worst SNR,
and where $w_{max}$ (maximum) is selected such that $$|(w_{max}, h)| = \max\{|(w_{max}, h)| : w$$

is a quantized feedback code vector} and $$(w_{min}, w_{max}) = 0.$$

* * * * *